US009129266B2

(12) United States Patent
Nagaraj

(10) Patent No.: US 9,129,266 B2
(45) Date of Patent: Sep. 8, 2015

(54) AUTOMATED SCHEDULE SYSTEMS AND METHODS

(76) Inventor: Sharat Nagaraj, Raleigh, NC (US)

( * ) Notice: Subject to any disclaimer, the term of this patent is extended or adjusted under 35 U.S.C. 154(b) by 87 days.

(21) Appl. No.: 13/163,684

(22) Filed: Jun. 18, 2011

(65) Prior Publication Data

US 2011/0314115 A1 Dec. 22, 2011

Related U.S. Application Data

(60) Provisional application No. 61/356,312, filed on Jun. 18, 2010.

(51) Int. Cl.
*G06Q 10/10* (2012.01)

(52) U.S. Cl.
CPC ............ *G06Q 10/1095* (2013.01); *G06Q 10/10* (2013.01); *G06Q 10/109* (2013.01)

(58) Field of Classification Search
None
See application file for complete search history.

(56) References Cited

U.S. PATENT DOCUMENTS

| | | | |
|---|---|---|---|
| 7,058,853 B1 * | 6/2006 | Kavanappillil et al. ......... 714/13 |
| 7,085,818 B2 * | 8/2006 | Brown et al. ................. 709/217 |
| 7,089,193 B2 * | 8/2006 | Newbold ..................... 705/7.27 |
| 7,143,417 B2 * | 11/2006 | Myers .......................... 719/318 |
| 7,519,924 B2 * | 4/2009 | Bocking et al. ................. 706/20 |
| 7,624,424 B2 * | 11/2009 | Morita et al. ..................... 726/1 |
| 7,702,545 B1 * | 4/2010 | Compton et al. ............ 705/26.9 |
| 7,747,458 B2 * | 6/2010 | Lyle et al. .................... 705/7.19 |
| 7,865,386 B2 * | 1/2011 | Sarkar .......................... 705/7.16 |
| 7,937,439 B2 * | 5/2011 | Lurie ........................... 709/204 |
| 8,244,566 B1 * | 8/2012 | Coley et al. ................... 705/7.11 |
| 8,527,589 B2 * | 9/2013 | Russo et al. ................... 709/205 |
| 8,577,696 B2 * | 11/2013 | Fram et al. ........................ 705/3 |
| 2002/0102012 A1 * | 8/2002 | Keller et al. .................. 382/128 |
| 2003/0086536 A1 * | 5/2003 | Salzberg et al. ........... 379/15.02 |
| 2003/0131143 A1 * | 7/2003 | Myers .......................... 709/318 |
| 2003/0154116 A1 * | 8/2003 | Lofton ............................. 705/8 |
| 2004/0098740 A1 * | 5/2004 | Maritzen et al. ............... 725/27 |
| 2004/0267585 A1 * | 12/2004 | Anderson et al. .................. 705/8 |
| 2005/0002501 A1 * | 1/2005 | Elsey et al. ................. 379/88.17 |
| 2005/0002509 A1 * | 1/2005 | Elsey et al. ............. 379/201.01 |
| 2005/0097440 A1 * | 5/2005 | Lusk et al. .................. 715/500.1 |
| 2005/0102154 A1 * | 5/2005 | Dodd et al. ..................... 705/1 |
| 2005/0132033 A1 * | 6/2005 | Russo et al. ................... 709/223 |
| 2005/0222875 A1 * | 10/2005 | Lordeman et al. ................ 705/3 |
| 2005/0262132 A1 * | 11/2005 | Morita et al. ................ 707/102 |
| 2006/0015376 A1 * | 1/2006 | Sattler et al. ...................... 705/5 |
| 2006/0293943 A1 * | 12/2006 | Tischhauser et al. ............. 705/9 |
| 2007/0021998 A1 * | 1/2007 | Laithwaite et al. ............... 705/9 |
| 2007/0282656 A1 * | 12/2007 | Battcher et al. ................... 705/8 |
| 2008/0033889 A1 * | 2/2008 | Tappan et al. ............... 705/36 R |
| 2008/0040193 A1 * | 2/2008 | Dion ................................ 705/9 |
| 2008/0091726 A1 * | 4/2008 | Koretz et al. ............... 707/104.1 |
| 2008/0195312 A1 * | 8/2008 | Aaron et al. ................... 701/209 |
| 2008/0249830 A1 * | 10/2008 | Gilman et al. ..................... 705/9 |
| 2009/0125332 A1 * | 5/2009 | Martin ............................. 705/3 |
| 2009/0125358 A1 * | 5/2009 | Reynard ............................ 705/8 |
| 2009/0164236 A1 * | 6/2009 | Gounares et al. ................. 705/2 |
| 2009/0177503 A1 * | 7/2009 | Kawano et al. ................... 705/5 |
| 2010/0070297 A1 * | 3/2010 | Kharraz Tavakol et al. ...... 705/2 |
| 2010/0070303 A1 * | 3/2010 | Massoumi et al. ................ 705/3 |
| 2010/0106626 A1 * | 4/2010 | Ashrafzadeh et al. .......... 705/29 |
| 2010/0153162 A1 * | 6/2010 | Tam et al. ......................... 705/8 |
| 2010/0191552 A1 * | 7/2010 | Behrens et al. ................... 705/5 |

* cited by examiner

*Primary Examiner* — Ninos Donabed
(74) *Attorney, Agent, or Firm* — Triangle Patents, PLLC

(57) ABSTRACT

Automated notification and acceptance/rejection of appointment or opening in a calendar/schedule via network-based systems and methods, including application over social networks and website based connection between users and service providers.

12 Claims, 2 Drawing Sheets

AUTOMATED SCHEDULE SYSTEMS AND METHODS

CROSS-REFERENCE TO RELATED APPLICATIONS

The present invention is related to one or more prior-filed co-pending patent applications and claims priority therefrom; it claims the benefit from U.S. Provisional Patent Application Ser. No. 61/356,312 filed Jun. 18, 2010, which is incorporated herein by reference in its entirety.

BACKGROUND OF THE INVENTION

1. Field of the Invention

The present invention relates to scheduling systems and methods and, more specifically, to automated schedule and calendar systems and methods with network-based notification of specific time-slot openings or availability.

2. Description of the Prior Art

It is generally known in the prior art to provide social networking systems that provide a match based on compatibility of user interests. Social networking systems based on user-generated lists of interests and goals where the contents of the list are prioritized or ranked are also known.

By way of example: U.S. Pat. No. 7,451,161; US Pub. Nos. 2006/0247940 & 2009/0024548 for Compatibility scoring of users in social networking, assigned to Friendster, Inc., describes a method of quantifying compatibility of interests or similarity in interests between members of a social network and providing a match based on the compatible interests. A set of individuals who are within a predetermined degree of separation from a first individual are taken and a compatibility score is computed between the first individual and each of the individuals in the set. Compatibility of the individuals is scored based on compatibility of interests, and these compatibility results and compatibility scores are presented to the individuals. Compatibility scores are linked to interest profiles, encouraging people to enter interests so the site can find other people who share the same or compatible interests.

U.S. Pat. No. 7,502,748 for Job matching system and method, assigned to Careerious Inc., describes a job matching system and method that utilizes personality profiles and candidate interests to match candidates to jobs. Employment position data is received from potential employers and individual candidate data is received from job candidates. The candidate data is compared with the employment position data to create a list of employment positions that match the candidate data. A score indicative of a candidates' suitability for a given employment opportunity is calculated from the comparison of the employment position data and individual candidate data U.S. Pat. No. 7,617,160 for Choice-based relationship system (CRS), assigned to Grove, describes a system to connect event participants with other event participants having similar interests. The event may be a business conference, a cruise, a social gathering, or a virtual event. Profiles are created for the participants indicating preferences and characteristics of the participants. In response to an inquiry from a participant, profiles are compared and matches to other participants with similar interests are generated. This system allows the participants to connect with each other before, during, and after the event.

US Pub. No. 2008/0288494 for System enabling social networking through user-generated lists, describes a social networking method using user generated lists. A list database is generated based on the lists created or populated by users of the system. The list database may also include previously built lists or lists of publications, organizations, or groups. The method includes receiving a first list of items from a first user, receiving a second list of items from a second user. The determination of position of items in a third list includes performing a mathematical computation involving the first value corresponding to a first position of the first item in the first list and the second value corresponding to a second position of the first item in the second list. The third list is then displayed on the computer screen with items in that order. Users can generate a list (e.g., favorite movies) and share the list with others who can then rank the list according to their own preferences. Users can also search or browse lists created by others.

US Pub. No. 2009/0187829 for aggregation and visualization of reused shared lists, describes a shared list social networking system and provides for aggregating and visualizing reused shared lists. An example of a shared list is a rank-ordered list of likes or dislikes. Describes that users can select an existing shared list on a topic, view rank-ordered results, create a new shared list on the topic incorporating users individual rank-ordering of the shared list, and save the new shared list in association with the existing shared list. An aggregation view displays items for each rank or lists items in rank order based on the rankings of multiple users.

US Pub. No. 2008/0162431 for identifying interest twins in an online community, describes a method for identifying members in an online community with similar interests to other members of the online community, and determining if the users are "interest twins". "Interest twins" are members that have demonstrated interest in the same or similar items. Member interests are identified by "interest-actions" such as following a link to a web page, bookmarking a web page, tagging items, playing or downloading videos, etc. Information on "interest twins" is used to enhance the experience of the user, such as ranking or highlighting search results from a search engine based on the interests of a user's "interest twin". This invention does not appear to describe introductions or personal connections with "interest twins".

US Pub. No. 2009/0327270 for Using variation in user interest to enhance the search experience describes a method to enhance the search experience by making the results list responsive to the interests of different individuals and groups of users. The system includes a search interface that determines the variability of search interests (e.g., goals) given queries, and a search experience enhancer. The search interface accepts a query from a user as input, and determines a variability in user interest (e.g. in search goals) for the query.

Furthermore, it is generally known to provide calendar, schedule, or time-based systems and methods using computer software and network or cloud-based access, or shared calendaring. The present invention relates to calendar, schedule, and/or time-based systems and methods using computer software for providing network or cloud-based notification for time slot openings or calendar/schedule availability including providing notification system based upon predetermined social network connections to individuals, companies, and service providers of interest to a participant or user. Users of the system can opt-in to the notification system based upon a click-select activation or hyperlink from an interactive graphical user interface (GUI) on a website accessed through a network, such as the internet.

US Publication No. 20080098313 for System and method for developing and managing group social networks describes a system and method for facilitating the configuration and management of events within a social networking system, wherein members of similar or different geographic locations and/or interests, hobbies, social status, relationship status can interact with the system to view activities, register or participate in those activities and schedule activities; further describes a personal workspace that enables the members of the network to view the personal calendar and the scheduled events and activities, and registration.

U.S. Pat. No. 6,978,246 for System and method for matching entities utilizing on electronic calendar system, assigned to IBM, describes an integrated matching service and calendaring system. In addition to the typical items represented by a calendared event, it utilizes a calendar event to represent an activity, the requirements to match the activity, the entity attributes, and any match results; an entity defines criteria and information for a matching activity, and the information and criteria concerning the activity are represented as a calendar event in an electronic calendaring system; calendar events representing matching activities and criteria are communicated to a matching server via a calendar access protocol, the matching server notifies suitable matches, if any, and notifies the entities involved of the match.

U.S. Pat. No. 7,383,303 for System and method for integrating personal information management and messaging applications, describes a computer-implemented method that identifies a set of contacts and/or contact groups permitted to contact a user of a data processing device during a scheduled event in an electronic calendar; a communication event is received from a first contact over a communication channel and is compared against the identified set of contacts and/or contact groups permitted to contact the user. Further, the user of the communication event is notified during the scheduled event only if the first contact is in the set of contacts and/or contact groups.

US Patent Application Publication No. 20020191035 for Computerized customizable scheduler, which describes a customizable software method for creating and maintaining a scheduling calendar for people and resources in a professional, personal, or service environment, including maintaining and updating a database to augment the scheduling calendar, with extensive reporting functions for planning, management, and marketing functions of an individual or business.

U.S. Pat. No. 7,174,303; US Pub. No. 20020032588 for Customer driven sponsor controlled network based graphical scheduling system and method, describing a method for developing a schedule for a sponsoring organization and includes providing a sponsor controlled customer database containing information relevant to individual customers who periodically need to schedule appointments with the sponsoring organization, a set of sponsor parameters associated with each customer, which define possible appointment times for a customer, and a central controller for displaying and managing a schedule for the sponsoring organization; the system contacts some of the customers concerning scheduling appointments with the available appointment times determined by the sponsor parameters associated with the individual customer via the electronic network, and the system receiving scheduling information via the electronic network from at least some of the customers; may also include a graphical calendar to at least some customers, wherein the customer can schedule an appointment by selecting the icon associated with the desired appointment time; the controller may use email to contact customers, and use the Web to supply available appointment times and receive scheduling information from the customers; offline communication may also be used.

U.S. Pat. No. 5,960,406 for Scheduling system for use between users on the web, describes a system comprising an end user interface that is generated in standard page markup syntax and sent using standard communication protocols to allow users to communicate with the system, delivering the scheduling events to end users of the system, and means for confirming proposed events by the end users; the computer systems include a client interface that allows an initial end user to communicate a desire to schedule an event through the system to potential end users, a transport medium interface for allowing the system to transport proposed event schedules between potential end users of the system and a computer subsystem for generating for the initial end user of the system, a calendar that is adapted to contain the events for that initial client, modifiable when other end users of the system, or that first user messages about events into the calendar of the initial user.

SUMMARY OF THE INVENTION

The present invention relates to systems and methods for automatic network-based calendar availability notification and interactive acceptance by users associated with service providers, businesses, and/or individuals.

The systems and methods of the present invention also provide for automated appointment opening notification matching or corresponding to user-indicated availability or lead-time notification for predetermined users associated with service providers, businesses, and/or individuals.

These and other aspects of the present invention will become apparent to those skilled in the art after a reading of the following description of the preferred embodiment when considered with the drawings, as they support the claimed invention.

DETAILED DESCRIPTION

Figure 1:
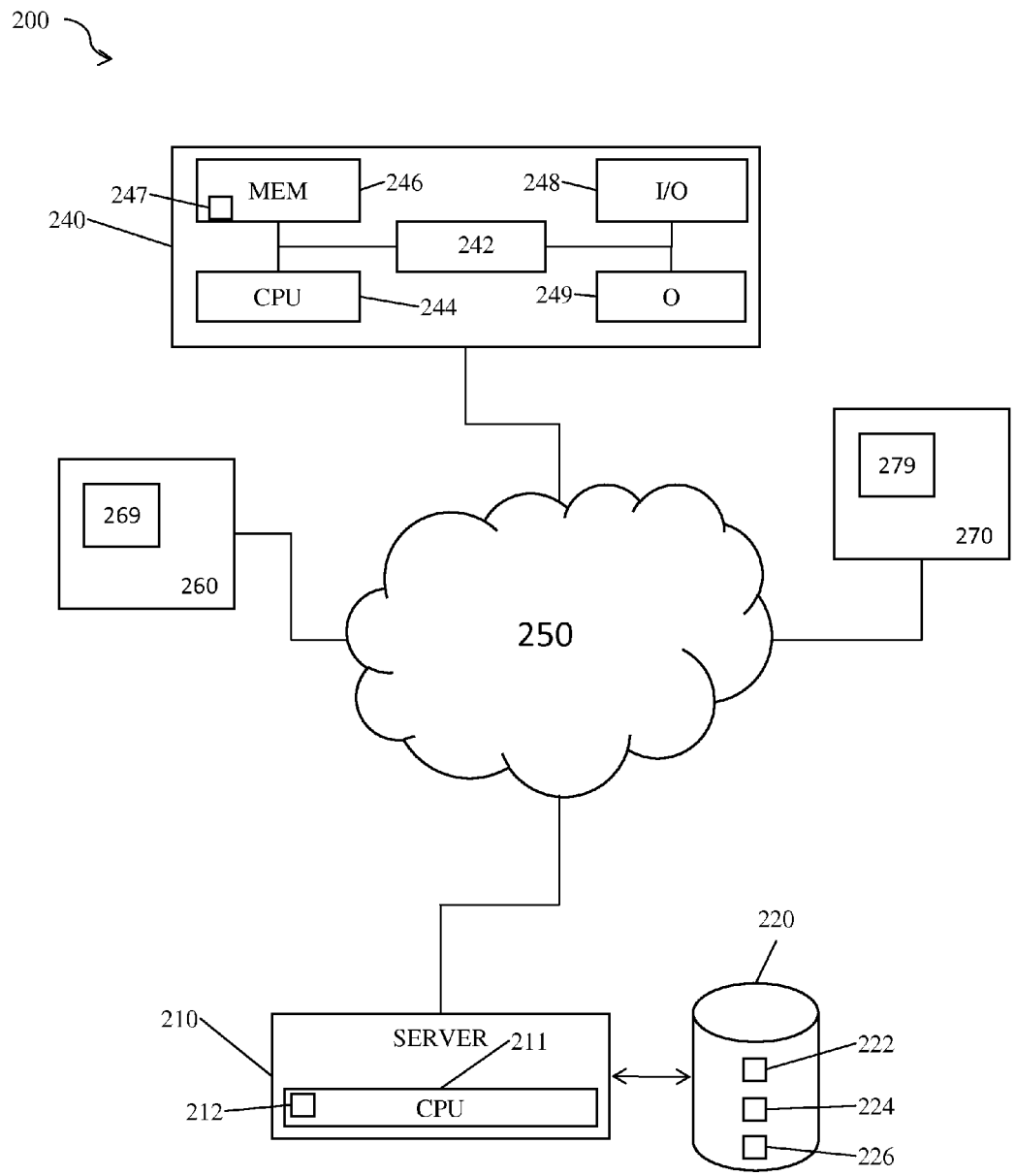
FIG. 1 is a schematic diagram of one embodiment of the invention.

Referring now to the drawings in general, the illustrations are for the purpose of describing a preferred embodiment of the invention and are not intended to limit the invention thereto.

The present invention provides for a systems and methods for network-based calendar availability notification and interactive acceptance by users associated with service providers, businesses, and/or individuals.

The systems and methods of the present invention also provide for automated calendar opening (or appointment availability) notification matching or corresponding to user-indicated availability or lead-time notification for users associated with service providers, businesses, and/or individuals. Users may be predetermined (pre-registered with the system for their preferences) or not. Also, preferably the systems and methods may be provided for cloud or virtualized systems, such as a web-based hosted solution.

Systems and methods of the present invention are not limited to business-based appointments, schedule or calendar openings, for example, within a social network of a user and his/her associated with friends, the user indicates how much lead time is required in advance of an event in order to receive or accept an invitation.

Preferably, the systems and methods of the present invention automatically and predictively manage notification of calendar openings in multiple dimensions including a time dimension and a priority dimension, wherein users may be assigned levels of priority such as first tier, second tier, etc., and wherein notification for time-based calendar openings is provided in order of priority level to matched users within a network (predetermined, opt-in, or opt-out), such as, for example but not limitation a social network.

As shown in FIG. 1, the system 200 comprises a server 210 with a processing unit 211. The server 210 is constructed, configured and coupled to enable communication over a network 250. The server provides for user interconnection with the server over the network using a personal computer (PC) 240 positioned remotely from the server. Furthermore, the system is operable for a multiplicity of remote personal computers or terminals 260, 270 to access the server remotely. For example, in a client/server architecture or alternatively, and preferably, a user may interconnect through the network 250 using a user device such as a mobile communication device, such as by way of example and not limitation, a mobile phone, a cell phone, smart phone, laptop computer, netbook, a terminal, personal digital assistant (PDA), or any other computing device suitable for network connection. Also, alternative architectures may be used instead of the client/server architecture. For example, a PC network, or other suitable architecture may be used. In preferred embodiments, the network 250 is the Internet, or it could be an intranet, or any other network suitable for searching, obtaining, and/or using information and/or communications, including receiving the notification and providing a response.

The system of the present invention further includes an operating system 212 installed and running on the server 210, enabling server 210 to communicate through network 250 with the remote, distributed user devices. The operating system may be any operating system known in the art that is suitable for network communication.

A memory 220 is interconnected with the server 210. Memory 220 may be integral with server 210 or may be external to the server and interconnected therewith. A program of instruction 222 is stored on memory 220. According to an exemplary embodiment, the program 222 is computer executable code for using information derived from usage of a communication network to develop a social network for automated notification of calendar openings or appointment availability, or using existing social networks for distribution of the notification, and then the network users or customer users respond through the system for responding affirmatively or negatively to the notification (accept or decline, accept or non-response is decline, etc.). Alternatively, portions of the program for automatic notification of calendar opening or appointment availability 222 may be installed on a user's computing device 240; however, in preferred embodiments, the system is cloud computing based, with the remote client or customer computer devices merely accessing the system and receiving notification via the web or other network.

A remote user (either service provider or customer user) may connect to the server 210 through network 250 from a computing device 240. According to an exemplary embodiment, computing device 240 is a personal computer. Computing device 240 may comprise a bus 242 interconnected to the network 250 such as through a modem, an Ethernet card, or the like. A processing unit 244 may be interconnected with the bus 242. A memory 246 may be interconnected with the processing unit 244 through bus 242. The computing device 240 may also comprise one or more input/output devices 248, such as a mouse, a keyboard, a printer, and the like interconnected to the processing unit 244 through bus 242. A display 249, 269, 279 may be interconnected with the processing unit 244 through bus 242 for providing a graphical user interface on a display, corresponding to a website, preferably interactive GUI and website.

Computing device 240 may have a program of instruction 247, such as a driver enabling computing device 240 to interconnect with server 210 through network 250.

When the user enters inputs information into the memory 220, the server 210 creates and updates a profile database 222. The server then executes a matching program 224 against the data stored in memory 220, which includes any data relating to the system for all time or predetermined time. The program 224 detects attributes of the usage, and uses those attributes to build the constraints for receiving notification or acceptance of schedule openings 224, such as, by way of example but not limitation, for lead time indications. The server stores the constraints and other data associated with users and profiles of businesses, service providers, and/or individuals and their corresponding schedule or calendar information 224 in memory 220. As will be described in greater detail below, the schedule or calendar opening notification 224 includes concepts (represented by vertices) and relationships (represented by edges) which relate those concepts to the user.

The profile database 222, informs the schedule or calendar opening notification agent 224 to identify concepts of interest to the user, such as, by way of example and not limitation, calendar availability, desired goods and/or services, as well as relationships, areas of interest, etc., and to build a network 226, such as a social network, based on those interests. This social network may be temporal, automatically being disbanded upon some completion event, such as the user completing an appointment, or the user responding positively to a prompt to terminate or initiating a termination request to the social network. Alternatively, the social network may remain in effect until proactively terminated by the user. Optionally, other users with common interests may be prompted as to whether or not they wish to join the social network, and added only if they take an acceptance action.

Figure 2:
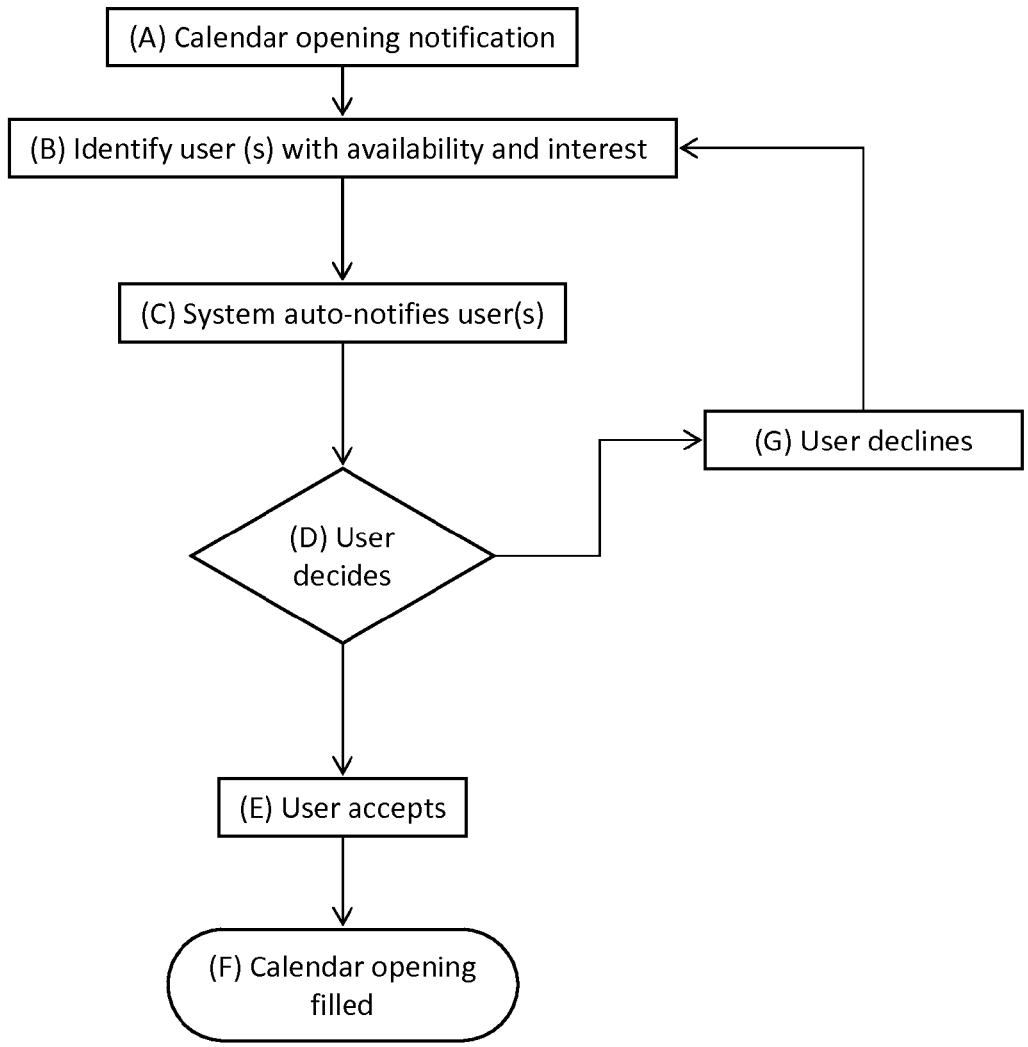
FIG. 2 is a flow diagram of a method according to the present invention.

FIG. 2 is a process flow diagram illustrating a method of automated notification and acceptance/rejection of appointment or opening in a calendar/schedule via network-based systems and methods according to the present invention. Basic method steps include (A) the calendar receiving an opening notification; (B) the calendar identifying at least one user with availability, interest and sufficient lead time to change to the newly-available opening; (C) the system auto-notifying the at least one user of the new opening; (D) the user deciding whether to accept the new opening. If (E) the user accepts the new opening, then (F) the calendar marks the opening as filled; if (G) the user declines the new opening, then (B) the system searches for other available users.

In one embodiment of the present invention, the systems and methods provide for an automatic notification of a calendar opening from a service provider to the server, wherein the service provider has preferably established an account with a profile that is stored on the database (this preferably follows a basic registration process, including account identification (or username) and corresponding passcode that uniquely identify each service provider). Similarly, customer users register with the system through the internet from a remote computer device or smartphone, computer tablet, etc. Customers have additional options to designate in the user profile in addition to account identification (username) and passcode, including but not limited preferred notification means, such as by SMS or text message, email, pager, mobile phone contact, interactive voice call, automatic calendar request, and combinations thereof; lead time notification requirements (which can vary, depending upon the type of service provider and/or services), and can be selectively modified by the customer user to reflect schedule changes by day, week, month, or random changes in situation and response time; level of priority requested, which can be based upon fee structure, e.g., higher fees for higher priority and first notification and exclusive response period, etc.; opt-in or opt-out matching, which can vary based upon type of service provider and/or services.

Customer users can register with the system by click selecting on a calendar opening notification within the website of the service provider user, or by registering directly with the system and then providing inputs for notification requirements or restrictions in the user profile database. Or a service provider may enter existing clients into the system. Social network connection, e.g., via facebook.com, gmail, etc.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc. and is implemented on a cloud-based or virtualized network system.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain, store, communicate, propagate, or transport the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable media, including but not limited to compact discs, floppy discs, USB memory devices, and the like. Moreover, the program product may be in the form of a machine readable transmission such as blue ray, HTML, XML, or the like.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

Referring now to the examples, in general, these examples are for illustrations for the purpose of describing a preferred embodiment of the invention and are not intended to limit the invention thereto.

Example 1

Medical Services

For a medical office, wherein appointments are calendared for at least one physician, such appointments being provided on an electronic calendar or schedule that provides inputs to the systems and methods of the present invention via a network, such as the internet, these inputs including a listing of at least one appointment availability or opening within the calendar of scheduled appointments for the at least one physician. Due to the appointment calendar, there may be a few weeks or even months before the next available appointment exists, until or unless there is a cancellation. There may be a wait list of appointments for next available appointment, such as for the case of a cancellation. Then the wait list of patients or users who have matched, connected, or associated with the at least one physician, each with an indication of lead time required to receive notification and accept same for an appointment, is provided within the system and stored within the database, or does the system auto search each time. Upon receipt to the appointment match system and automatic notification engine of the present invention, the system automatically identifies which, if any, users associated with the at least one physician have matching lead time required to receive notification of the calendar/schedule opening. For a match, the system automatically sends an electronic notice, via email, text message/SMS, or phone to the user. The notice may include a predetermined response period during which a period of exclusivity for accepting the appointment, time slot, or calendar opening. After such a predetermined response period as expired, or upon rejection response from the first user notified, the system automatically provides notification to a second user, or a group of lower priority users. This may be repeated until and unless acceptance of the time slot, appointment or calendar opening is filled or satisfied. Variations from this example may exist without departing from the scope of present invention.

Example 2

Personal Services

Personal services include hairdresser, massage, salon, and the like. Notifications for these appointment or calendar openings may be made as a result of a cancellation, or as a result of an opening that is not filled. These notifications are likely first made on the basis of lead time notification, but may also include geographic considerations of the customer users. Note also that discounts may be included if lead times are short, even where the notifications are made or not made on the basis of priority. Also, automatic notification continues until the calendar opening is filled, with discounts being optional and being time-triggered, so that as the lead time decreases, when it reaches a predetermined point, then a discount is offered; multiple or higher discounts may be included as the lead time decreases.

Example 3

Restaurant Reservations

Similar to the other calendar opening automated notifications of the present invention, notification of restaurant reservations are made to those matches between customer users (based on lead time, geography, priority, etc.) and service provider users. However, in the case of restaurant reservations, since the lead times may be much shorter (cancellations, etc.), it may be that the customer users are actually other service provider users, such as hotels, wherein the concierge then provides notification to guests (second tier customer users) within its network (those registered with the hotel that evening, or scheduled to be registered at the hotel on a future evening corresponding to the restaurant calendar opening). In this way, the calendar opening notification system and methods of the present invention provide for integration with other calendar inputs, such as guest reservation systems, for notification of the guest directly by the system (if they are a registered user) or for notification to the hotel and then by the hotel to the guest (the end customer user).

Example 4

Entertainment Event or Live Performance

In the case of an entertainment event or live performance, issues with ticket or seating availability may exist; since each ticket or seating availability is associated with a specific time and location, it may be considered similarly to any other calendar opening or appointment availability. Also, it may be associated with a predetermined number of tickets for an event occurring at a predetermined time/date and location, or for a series of time/date and locations. Priority notification is known in the relevant art, such as for reserve ticket ordering or sections for season ticket holders, or for select members of associations, such as credit card holders of a certain type (AMEX Platinum). However, the present invention addresses the situation wherein the assessment of calendar opening for non-predetermined tickets or seating availability, i.e., wherein there remain unsold tickets that were not set aside or reserved in advance. These may be randomly distributed with respect to cluster, date/time, location, and/or proximity to the stage or other preferred seating arrangement Prioritization or priority level associated with the customer users may be established by the customer user themselves through self-identification as priority level user by paying a fee or registering in another manner with the system overall via the profile database and server, or directly with service providers, or earning the priority status, being selected for priority status by the service provider, or combinations thereof. In the case of overall priority, the customer user is given a higher priority over non-priority level users, or lower level priority customer users of the system, and receives notifications in advance of other customer users (fees or other factors may reflect the amount of lead time, the amount of exclusive response time, etc., which may be in minutes or days). In the case of priority directly established with the service provider users of the system, the notification of calendar opening is indicated by the service provider user to the system, and also includes a notification priority established by the service provider, which the system automatically registers and follows until the calendar opening is accepted. And in the case of combination, wherein there is both a direct priority established with the servicer provider user by the customer user, and there is a customer-established priority overall within the system, then first the prioritization established by the service provider is followed by the system, and then if the calendar opening or appointment is not filled, then further notification is made according to the system priority, which takes a secondary priority level behind the service provider notification prioritization, according to preferred embodiments of the present invention.

Social network development within the systems and methods of the present invention are established by customer users directly or indirectly, by registering selectively with predetermined service providers within the system (offered by selective inputs registered by the system from remote customer users and modifiable at any time by those customer users, such as by click select through GUI website, dropdown select menu, etc.) or by agreeing to be notified for any service providers within the system for predetermined categories of services within predetermined geographies and/or times. Also or alternatively, service provider users may input pre-existing customer users into the profile database, which may be closed or open to those service providers only. The customer users may agree to be open to any and all service providers of specific types within a predetermined geography. Alternatively, where the customer users and service provider users are all "friend" or "business" users within a social network, if the customer and service provider users have been previously connected in a social network of friends or professional contacts, then they may be open to invitations to events so long as those notifications match requirements of lead times of the customer users. Note that in this case, the service provider users are the "asking" or "inviting" users, and the customer users are the "accept" users. These invitations may be to social events, dates, parties, meetings, etc. and combinations thereof. Other matching requirements may be included, such as those pre-existing or those selectively indicated and input by the customer members at any given time within the system. Additionally or alternatively, entire social networks or subsets thereof may be introduced if an organization joins or provides priority access to its members, for example, through an agreement with at least one service provider, or with the system management agent.

Sell/trade access to the calendar opening; this applies to all types of transferable appointments or calendar openings, including but not limited to professional appointments, service appointments, personal services, tickets, events, food or other reservations, airline seats, etc. Since there is a value on each side the calendar opening "owned" by the customer user who accepted it first is the potential "seller" and the other customer user(s) who have an interest and value to exchange for the calendar opening are would be "buyer(s)" of the calendar opening or time slot. Where the seller has more time flexibility, and the buyer has less time flexibility or greater interest in reduced lead time to appointment or calendar opening, there is more value to the buyer for that priority time slot, appointment or calendar opening. A secondary notification system and methods exist in parallel to or subsequent to the primary notification system as described and set forth hereinabove. In preferred embodiments, this secondary notification system and methods are established either directly between customer users or between customer users indirectly through the server on a secondary level. In the case of an acceptance by a first customer user of a calendar opening, wherein that first user has increased flexibility of schedule but would like to have other offsets or compensation or other reward in exchange for conferring the now accepted calendar opening to a second customer user, there is an exchange system and methods that provide for the transferability of the calendar opening. Other customer users (apart from the first user who accepted the calendar opening) can request the calendar opening; a notification of this exchange request is delivered automatically to the first user, unless the first user has provided within the profile database (either overall or selectively for that calendar opening that was accepted) that s/he is not willing to make an exchange. The first user can selectively accept or decline the request from the other customer user(s). This request may be made directly or indirectly; it may be accompanied by an exchange offer or there may be a bid process that downselects the top other customer user(s) based upon bid level and notification lead time requirements of those other customer user(s). In another option, the first customer user who accepted the calendar opening may release a notification for exchange to the system server via the network, indicating that s/he is flexible with schedule, and would like to solicit bids or offers to exchange from other customer user(s) who have indicated that they are willing to accept such secondary notification, or if they have not opted-out from receiving such notifications.

The system and methods of the present invention are preferably not limited to business-based appointments, schedule or calendar openings, for example, within a social network of a user and his/her associated with friends, the user indicates how much lead time is required in advance of an event in order to receive or accept an invitation.

Also, preferably, the present invention systems and methods for provide for automatically and predictively managing notification of calendar openings in multiple dimensions including a time dimension and a priority dimension, wherein users may be assigned levels of priority such as first tier, second tier, etc., and wherein notification for time-based calendar openings is provided in order of priority level to matched users within a network (predetermined, opt-in, or opt-out), such as, for example but not limitation a social network.

By contrast to prior art calendaring, the present invention provides for the users or customers to enter his/her geographic zone and requesting the appointment or calendar availability. The system also preferably provides for a retraction option, or the ability to pull-back appointments or notifications of opportunities for calendar opening.

By way of example but not limitation, for a 4 weeks out appointment, the system provides for an automatic notification to all users indicating availability at less than 4 weeks out, but based upon appointment type, availability, etc., and also optionally based upon priority or status of the user within the system. Thus, the system has an automated intelligence for automated appointment fulfillment with predetermined prioritized candidates based upon the user-determined or user-defined factors input to the system. So then there is a shuffling function that is also automatic, if a first appointment by a first user is replaced with a second appointment by a second user following the cancellation by the first user for the first appointment, then now the second appointment is a new slot open for anyone available within those constraints, and in this case the first responder that is accepted by the system is the second user, who has secured the second appointment, etc.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for automated notification of calendar openings based on user information derived from use of a network comprising: a memory and a processor,
   a server creating a profile in a profile database based on inputs of at least one customer user through a computing device over a social network;
   the server executing a matching program detecting attributes of the profile in the profile database;
   the program building constraints for the at least one customer user receiving a notification of a calendar opening based on the attributes;
   the profile database informing a calendar opening agent to identify concepts of interest to the at least one customer user based on the profile;
   at least one service provider using the communication network through a second computing device to indicate a notification of a calendar opening;
   the calendar opening agent receiving a notification of the calendar opening from the at least one service provider user;
   the calendar opening agent identifying at least one available user with availability and/or concepts of interest matching the calendar opening; and
   automatically notifying the at least one available user of the calendar opening over the social network;
   wherein the inputs include a lead time required in advance of the calendar opening for the at least one customer user to be notified of the calendar opening;
   wherein the at least one available user is selected from the at least one customer user;
   wherein further comprising the step of assigning the at least one user a level of priority, wherein the level of priority is selected from the group including a first tier priority, a second tier priority, and a third tier priority, wherein the at least one available user includes at least one first tier priority user, at least one second tier priority user, and at least one third tier priority user, wherein the step of automatically notifying the at least one available user of the calendar opening through the social network is performed first for the at least one first tier priority user, second for the at least one second tier priority user, and third for the at least one third tier priority user; and
   wherein the step of assigning the at least one user the level of priority includes the at least one user paying a fee for the level of priority; and
   offering the at least one available user a discount for services associated with the calendar opening, wherein the discount is based on the difference between the time at which the step of automatically notifying the at least one available user of the calendar opening through the social network is performed and the date and/or the time of the calendar opening, wherein the discount is a dynamic discount, wherein the dynamic discount dynamically increases as the time until the calendar opening decreases.

2. The method of claim 1, wherein the step of assigning the at least one user the level of priority includes the at least one user earning the level of priority.

3. The method of claim 1, further comprising the step of the at least one available user accepting the calendar opening through the social network.

4. The method of claim 3, further comprising the step of the at least one available user receiving at least one request from at least one requesting user to transfer the calendar opening to the at least one requesting user, wherein the at least one request includes a compensation or a reward, further comprising the steps of the at least one available user transferring the calendar opening to the at least one requesting user and the at least one requesting user transferring the compensation or the reward to the at least one available user.

5. The method of claim 3, further comprising the step of the at least one available user releasing a notification for exchange through the social network, wherein the notification for exchange includes a solicitation for bids or offers to exchange the calendar opening.

6. A method for automated notification of calendar openings based on user information derived from use of a network comprising: a memory, and a processor;
   at least one customer user using a communication network through a computing device;
   a program using information derived from the at least one customer user's using the communication network through the computing device to develop a social network by identifying concepts of interest to the user;

a server creating a profile in a profile database based on inputs of at least one customer user through a computing device over a social network;

the server executing a matching program detecting attributes of the profile in the profile database;

the program building constraints for the at least one customer user receiving a notification of a calendar opening based on the attributes;

the profile database informing a calendar opening agent to identify concepts of interest to the at least one customer user based on the profile;

assigning the at least one customer user a level of priority, wherein the level of priority is selected from the group including a first tier priority, a second tier priority, and a third tier priority, wherein the at least one available user includes at least one first tier priority user, at least one second tier priority user, and at least one third tier priority user;

at least one service provider using the communication network through a second computing device to indicate a notification of a calendar opening;

a calendar opening agent receiving the notification of the calendar opening from the at least one service provider user;

the calendar opening agent identifying at least one available user with concepts of interest matching the calendar opening;

automatically notifying the at least one available user of the calendar opening through the social network;

offering the at least one available user a discount for services associated with the calendar opening, wherein the discount is based on the difference between the time at which the step of automatically notifying the at least one available user of the calendar opening through the social network is performed and the date and/or the time of the calendar opening, wherein the dynamic discount dynamically increases as the time until the calendar opening decreases; and the at least one available user accepting the calendar opening through the social network;

wherein the step of automatically notifying the at least one available user of the calendar opening through the social network is performed first for the at least one first tier priority user, second for the at least one second tier priority user, and third for the at least one third tier priority user;

wherein the at least one available user is selected from the at least one customer user; wherein the communication network is the Internet;

wherein the step of assigning the at least one customer user the level of priority includes the at least one customer user paying a fee for the level of priority.

7. The method of claim 6, further comprising the step of automatically disbanding the social network upon the at least one available user accepting the calendar opening through the social network.

8. The method of claim 6, further comprising the steps of prompting at least one additional user to join the social network, the at least one additional user indicating a desire to join the social network, and adding the at least one additional user to the social network.

9. The method of claim 6, wherein the step of assigning the at least one customer user the level of priority includes the at least one customer user earning the level of priority.

10. The method of claim 6, further comprising the step of the at least one available user receiving at least one request from at least one requesting user to transfer the calendar opening to the at least one requesting user, wherein the at least one request includes a compensation or a reward, further comprising the steps of the at least one available user transferring the calendar opening to the at least one requesting user and the at least one requesting user transferring the compensation or the reward to the at least one available user.

11. The method of claim 9, further comprising the step of the at least one available user releasing a notification for exchange through the social network, wherein the notification for exchange includes a solicitation for bids or offers to exchange the calendar opening.

12. The method of claim 11, wherein the notification for exchange is only released to at least one willing user, wherein the at least one willing user has indicated a willingness to accept the notification for exchange, and wherein the at least one willing user is selected from the at least one user.

* * * * *